(No Model.)

F. W. BROOKS.
SEAL.

No. 498,103. Patented May 23, 1893.

Witnesses
Edwin L. Bradford
Curtis Lammond

Inventor
Franklin W. Brooks
By Sm C W Future
Attorney

UNITED STATES PATENT OFFICE.

FRANKLIN W. BROOKS, OF NEW YORK, N. Y.

SEAL.

SPECIFICATION forming part of Letters Patent No. 498,103, dated May 23, 1893.

Application filed January 5, 1893. Serial No. 457,305. (No model.)

*To all whom it may concern:*

Be it known that I, FRANKLIN W. BROOKS, a citizen of the United States, residing at New York city, in the county of New York and State of New York, have invented certain new and useful Improvements in Lead Seals; and I do hereby declare the following to be a full, clear, and exact description of the invention, such as will enable others skilled in the art to which it appertains to make and use the same.

My invention relates to certain new and useful improvements in lead seals.

It has for its object simplicity of construction and use, coupled with great security against fraud.

With these ends in view my invention consists of a lead seal of what I term button form, that is two disks joined by a connecting shank, the upper disk being considerably smaller than the lower one, and having its circumference beveled outward to form a knife edge at its lowest plane, and the lower disk having its circumference beveled in a reverse direction, in combination with a bail wire having one end thereof anchored in the shank and lower disk, all as will be hereinafter more fully described and specifically claimed.

In order that those skilled in the art to which my invention appertains may fully understand it, I will proceed to describe the construction, mode of application and the resulting advantages, by reference to the accompanying drawings in which—

Figure 1:
Figure 2:
Figure 3:
Figure 4:
Figure 5:
Figure 6:
Figure 7:
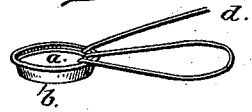
Figure 8:
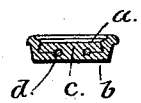

Figure 1 is a central vertical section of one of my improved seals. Fig. 2 is a similar view taken at right angles to that shown at Fig. 1, and showing the bail wire properly anchored in place. Fig. 3 is a horizontal section through the shank and showing the manner of securing the free end of the bail wire. Fig. 4 is a vertical section showing the first effect of compression between dies. Fig. 5 is a similar view showing the second progressive result of compression. Fig. 6 is a similar view showing the final or complete result of compression. Fig. 7 is a perspective view of the seal and bail wire. Fig. 8 is a vertical section showing another of the variety of results of compression, which may ensue according to the density of the lead, and pressure exerted and the condition of the dies employed; and Fig. 9 is a central section of a male and female die which I have found applicable in producing the result aimed at.

Similar letters indicate like parts in all the figures of the drawings.

The seal is composed of an upper disk $a$, a lower disk $b$, and a shank $c$, which latter may, if thought desirable, extend at one side out to the edge of the upper disk $a$, as shown at Fig. 2, to furnish a greater amount of lead within which to anchor the bail wire $d$. The upper disk $a$ is made of considerably less diameter than the lower disk, and its periphery is beveled outwardly and downwardly as clearly shown so that the lower edge will constitute a comparatively sharp angle or knife-edge. The lower disk is beveled in a reverse direction to the upper one to facilitate the removal of the seals from the molds, and also for the purpose of facilitating the movement of the lead in the turning of the edge of the lower disk over the edge and top of the upper one. The shaft $c$ which connects the two disks is formed integral therewith and is of such length as to furnish the proper space between the two disks to receive the free end of the bail wire $d$, which, as clearly shown at Fig. 3, is wound once or oftener around the shank and the exposed end turned to any desired position.

Figure 9:
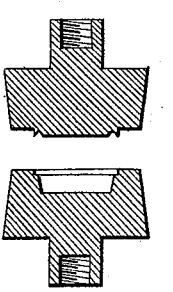

Any suitably constructed dies may be used, but I have found from experience that good results are accomplished by the employment of dies such as shown at Fig. 9.

The seals are cast in molds in the ordinary manner, with one end of the bail wire anchored in place as shown at Fig. 2, and when they are to be used, as for instance upon a bonded or freight car, the free end of the bail wire is passed through the staple on the car, and then within the space between the disks $a$ and $b$, and around the shank $c$, as shown at Fig. 3, and this may be done as well in the dark as in the light by the exercise of the sense of feeling, because no accurate threading of the wire is required. When the wire has been manipulated as just explained, the seal is placed between the dies and compressed. As pressure is exerted, the first effect produced by the inclined wall of the lower die is to turn up the edge of the lower disk b, as shown at Fig. 4; the next result of pressure is to partially compress and crush the shank c, and force the upper disk a downward and toward the lower disk until the lower knife edge of the disk a comes in contact with and is partially forced into the upturned wall of the disk b, and the final effect of compression between the dies is to completely crush the shank, to firmly lock the bail wire d, and to roll over and compress the extreme edge of the upturned wall of the lower disk b, so that the outer edge of the upper disk a is firmly locked and concealed, thus preventing access to the bail wire without completely destroying or defacing the seal. In order to secure the proper turning over of the edge of the lower disk, the upper or male die employed for compression should be formed near the periphery of that part of it which co-acts with the female die, with a circumferential V-shaped depression, which will according to its size, or general configuration force the entire upper edge of the lower disk (or a portion thereof only) over the edge of the upper disk. Different details of result will ensue according to the exact shape and condition of the dies, as well as the amount of pressure exerted, but in all cases the effect will be to force the sharp edge of the upper die into the wall of the lower one, and to turn the latter over and upon the former so as to effectually conceal its edge.

Slight variations may of course be made in the proportion and sizes of the disks and shank without departing from the spirit of my invention, so long as the generic principle is maintained of forming the disks with reversely beveled edges bearing such relation to each other that the interlocking action described takes place when the seal is compressed.

Having described the construction and mode of using my improved seal, as well as the advantages derived, what I claim as new, and desire to secure by Letters Patent, is—

A lead seal composed of two disks joined by a shank, the upper disk of less diameter than the lower one and having its edge beveled outwardly and downwardly, and the lower disk of greater diameter than the upper one and having its edge beveled upward and outward, in combination with a bail wire having one end anchored within the seal, substantially as and for the purposes set forth.

In testimony whereof I affix my signature in presence of two witnesses.

FRANKLIN W. BROOKS.

Witnesses:
N. CURTIS LAMMOND,
WM. C. MCINTIRE.